United States Patent [19]
Cabral et al.

[11] Patent Number: 6,002,738
[45] Date of Patent: Dec. 14, 1999

[54] SYSTEM AND METHOD OF PERFORMING TOMOGRAPHIC RECONSTRUCTION AND VOLUME RENDERING USING TEXTURE MAPPING

[75] Inventors: Brian K. Cabral, San Jose; James Foran, Miltitas, both of Calif.

[73] Assignee: Silicon Graphics, Inc., Mountain View, Calif.

[21] Appl. No.: 08/499,614

[22] Filed: Jul. 7, 1995

[51] Int. Cl.⁶ .................................................. A61B 6/03
[52] U.S. Cl. .................................. 378/4; 378/15; 378/901
[58] Field of Search .................................. 378/4, 15, 901; 382/131

[56] References Cited

U.S. PATENT DOCUMENTS

| | | | |
|---|---|---|---|
| 4,216,526 | 8/1980 | Karwowski | 364/414 |
| 4,222,104 | 9/1980 | Moore | 364/414 |
| 4,223,384 | 9/1980 | Hounsfield et al. | 3644/414 |
| 4,250,387 | 2/1981 | Hounsfield et al. | 250/445 |
| 4,398,251 | 8/1983 | LeMay | 364/414 |
| 4,639,941 | 1/1987 | Hounsfield | 378/11 |
| 4,843,618 | 6/1989 | Best et al. | 378/4 |
| 5,566,285 | 10/1996 | Okada | 345/430 |
| 5,710,876 | 1/1998 | Peercy et al. | 345/426 |

OTHER PUBLICATIONS

Cabral, Brian, Nancy Cam and Jim Foran, Silicon Graphics Computer Systems, "Accelerated Volume Rendering and Tomographic Reconstruction Using Texture Mapping Hardware", pp. 91–98, Jun. 1994.

Azevedo, Stephen G., Brain K. Cabral and James Foran, Silicon Graphics Computer Systems, "Tomographic image reconstruction and rendering with texture–mapping hardware", SPIE vol. 2299, pp. 280–291, Mar. 1995.

*Primary Examiner*—David Vernon Bruce
*Attorney, Agent, or Firm*—Sterne, Kessler, Goldstein & Fox P.L.L.C.

[57] ABSTRACT

Volume rendering and tomographic reconstruction center around solving two related integral equations: a volume rendering integral (a generalized Radon transform) and a filtered backprojection integral (the inverse Radon transform). Both of these equations are of the same mathematical form and can be dimensionally decomposed and approximated using Riemann sums over a series of resampled images. When viewed as a form of texture mapping and frame buffer accumulation, enormous hardware enabled performance acceleration is possible.

24 Claims, 6 Drawing Sheets

SYSTEM AND METHOD OF PERFORMING TOMOGRAPHIC RECONSTRUCTION AND VOLUME RENDERING USING TEXTURE MAPPING

BACKGROUND OF THE INVENTION

1. Field of the Invention

The present invention relates to the field of computer tomography, and more particularly to tomographic reconstruction and volume rendering using texture mapping.

2. Related Art

Volume visualization of real-time or recorded images encompasses not only viewing, but also construction of a volumetric data set from the more basic projection data obtained from sensor sources. Most volumes used in rendering are derived from such sensor data. A primary example being Computer Aided Tomographic (CAT) x-ray data. This data is usually a series of two dimensional projections of a three dimensional volume. The process of converting this projection data back into a volume is called tomographic reconstruction. The term tomographic reconstruction or Computed Tomography (CT) is used to differentiate it from signal reconstruction: the rebuilding of a continuous function (signal) from a discrete sampling of that function. See, Russ, J., *The Image processing Handbook,* CRC Press (1992), pp. 339–365; Kak, A. and Slaney, M., *Principles of Computerized Tomographic Imaging,* IEEE Press (1988), pp. 1–4; Bracewell, R., *Two-Dimensional Imaging,* Prentice-Hall (1995), pp. 505–538; and Jain, A., *Fundamentals of Digital Image Processing,* Prentice-Hall (1989), pp. 431–475.

Once a volume is tomographically reconstructed it can be visualized using volume rendering techniques. (See, Kajiya, J. and Von Herzen, B., "Ray Tracing Volume Densities," *Computer Graphics,* Vol. 18, No. 3, July 1984, pp. 165–174; Sabella, P., "A Rendering Algorithm for Visualizing 3D Scalar Fields," *Computer Graphics,* Vol. 22, No. 4, August 1988, pp. 51–58; Upson, C. and Keeler, M., "V-BUFFER: Visible Volume Rendering," *Computer Graphics,* Vol. 22, No. 4, August 1988, pp. 59–64; Drebin, B. et al., "Volume Rendering," *Computer Graphics,* Vol. 22, No. 4, August 1988, pp. 65–74; Westover, L., "Footprint Evaluation for Volume Rendering," *Computer Graphics* Vol. 24, No. 4, August 1990, pp. 367–376; Krueger, W., "The Application of Transport Theory to the Visualization of 3-D Scalar Fields," *Computers in Physics,* April 1991, pp. 397–406; and Totsuka, T. and Levoy, M., "Frequency Domain Volume Rendering," *Computer Graphics* , August 1993, pp. 271–278.)

The operations of tomographic reconstruction and volume rendering have traditionally been decoupled, being handled by two separate algorithms. Both operations have been commercially implemented by specialized, very expensive CT systems. Medical procedures that require this hardware are likewise expensive, thus limiting patients accessibility to such procedures. What is desired is a system and method for performing these operations in a more efficient, less costly manner.

SUMMARY OF THE INVENTION

Computed tomography (CT) provides an image representing a transverse slice (also referred to as a plane) of the body or an object. This slicing is accomplished by rotating an x-ray source and a detection means (e.g., a row (1-D) or 2-D array of sensors) around the perimeter of the section of the body or an object to be viewed. The source and detection means are placed 180° from each other to allow the detection means to measure the attenuation of the beam as it passes through the plane (slice) of interest. When enough measurements have been taken, a computer system is utilized to mathematically interpret the data, which is then displayed as a slice or an entire volume (via volume rendering) on a monitor (e.g., a television screen) for diagnostic and control purposes.

As noted above, processing and using CT data involved two basic steps: tomographic reconstruction and volume rendering. Both CT reconstruction and volume rendering are well-known processes. However, prior to the present invention both processes treated separately, and thus, accelerated with separate apparatuses. The present invention is directed at solving (and accelerating) both processes with a single apparatus, which performs texture mapping and weighted accumulation.

As a x-rays goes through the body and it is absorbed in proportion to the density of the object that it passes through. This is evident from the measured intensity along a straight line path, which is given by the following:

$$\int f(x, y) dl = \log_e \frac{I_o}{I_d} \qquad (1)$$

where $I_o$ is the incident intensity (e.g., from an x-ray tube or radioisotope), which is known and generally held constant, and $I_d$ is the detected intensity.

This is called the ray integral equation and describes the result along one projection through the object, and is commonly referred to as the Radon transform. Determining what the x-ray passed through based on the attenuation data (also called projection data) is called the inverse Radon transform. Filtered backprojection is a specific inverse Radon transform technique. Filtered backprojection takes the projection data in a manner described below, and smears the data back for each projection angle and then sums the data from all projections to provide information about the inside of the object. This summed data is filtered, using a high pass sharpening filter, to insure that the Fourier slice theorem will hold. Filtering is well known, and relatively easy. The difficulty is the backprojection, or smearing process. Conventionally, backprojection is calculated one output pixel at a time. For each pixel f(x,y) in the body (object) a determination is made as to what point in that projection data set the pixel maps to. This involves resampling, because a pixel inside the object may not line up perfectly with any one sensor. The point mapped to may be between two or more sensors, thus requiring the interpolation step.

According to the present invention, the inventors viewed the smearing as a texture mapping and resampling problem. Once this realization was made by the inventors, it became evident that conventional texture mapping hardware can be used to solve the reconstruction problem. Thus, the insight of the inventors to view this problem as a texturing mapping and accumulation problem is the heart of the invention. It is this re-thinking of the reconstruction problem in a different paradigm that resulted in the present invention. Once viewed as a texture mapping problem, the problem can be solved with texture mapping hardware at a very accelerated rate.

Similarly, volume rendering as described by (Drebin et al.) can be viewed as a texture mapping problem. According to the present invention, discrete points in the reconstructed CT data sets, called voxels, are summed along the line of sight (ray) from an observer point or viewer point. The line integral implied by this operation is merely a modified version of the forward Radon transfer (as we will mathematically show later). This can be recast as texture mapping by noting that every sample along the ray or line integral form planes (cylindrical or spherical shells), which can be texture mapped with the appropriate in-plane or in-shell voxel data. This proceeds back to front and is rendered to yield a projection of the original data.

Texturing mapping is a coordinate mapping of data from one coordinate space to another. Reconstruction data is typically recorded and stored as what is called a sinogram. According to the present invention, the inventors have treated the sinogram as a texture map, and have developed a system and method for mapping the projection data onto a polygon, which represents the beam space of the projection data, to yield the image of the object from which the projection data was taken.

The projection data is treated as beams traveling along or through the object space for both tomographic reconstruction and volume rendering. In the parallel beam case, the projection data collected by a row of sensors travels through the object space as a plane that has the geometry of a rectangle. Thus, in the fan beam case, projection data collected by a row of sensors travels through the object space as a plane, which essentially has the geometry of a triangle. Therefore, for texture mapping, the projection data (a data set represented as a sinogram, for example) is carefully selected and mapped onto a polygon that represents the beam space of the projection data.

In the preferred embodiment, the polygon is a circle oriented or rotated in the direction of the reconstruction. The data is smeared in the angle it was taken. In other words, a row of sensor data from the sinogram is texture mapped onto a polygon and the polygon is rotated. Rendering and accumulation of the polygon texture mapped with the reconstruction data using the texture mapping hardware results in a volumetric image of the object. The resampling occurs in the texture mapping hardware, since the texture mapping hardware is specifically developed to solve resampling problems.

For volume rendering the output image can either be constructed using parallel rays (orthographic projection) or fan/cone beam of rays (perspective projection). Here the planes or shells act as a resampling surface along all the rays simultaneously. Further, resampling with the plane must be performed since the projection of the rays on to the plane will not necessarily be a one-to-one correspondence to the voxel CT data.

The preferred embodiment is a plane orthogonal to the viewer's line of sight. The data is mapped into the plane (as if the plane took a thin slice out of the volume).

Again, the implied resampling is handled by the texture mapping hardware and the accumulation is handled by the associated frame buffer.

Theoretically, each output pixel of the object must be visible from each projection angle in a single cross sectional plane for parallel or fan beam reconstruction. The data belonging to that point from each angle is summed and normalized. Each sinogram therefore represents the projection data for a 360 degree pass of the source/sensors axis. Thus, for a 3-D volume image, data from many sinograms is used, where each sinogram represents a single cross sectional data set.

When a point is not seen for each view the data set is incomplete, and typically a reconstruction of that data will yield an inaccurate image. However, according to another embodiment of the present invention, iterative techniques are used to reconstruct data and then perform a forward Radon transform, followed by additional reconstruction(s) to converge on a final, accurate reconstruction. Note that since both processes have been unified within the texture mapping and accumulation (frame buffer) hardware, both are thus accelerated making such iterative solutions cost effective.

The mathematical and algorithmic similarity of volume rendering and backprojection, when reformulated in terms of texture mapping and accumulation, is significant. It means that a single high performance computer graphics and imaging computer can be used to both render and reconstruct volumes at rates of 100 to 1000 times faster than CPU based techniques. Additionally, a high performance computer graphics and imaging computer is an order of magnitude less expensive than a conventional CT system.

BRIEF DESCRIPTION OF THE FIGURES

The invention will be better understood if reference is made to the accompanying drawings in which.

DETAILED DESCRIPTION OF THE PREFERRED EMBODIMENTS

I. Nomenclature and Definitions

Figure 1:
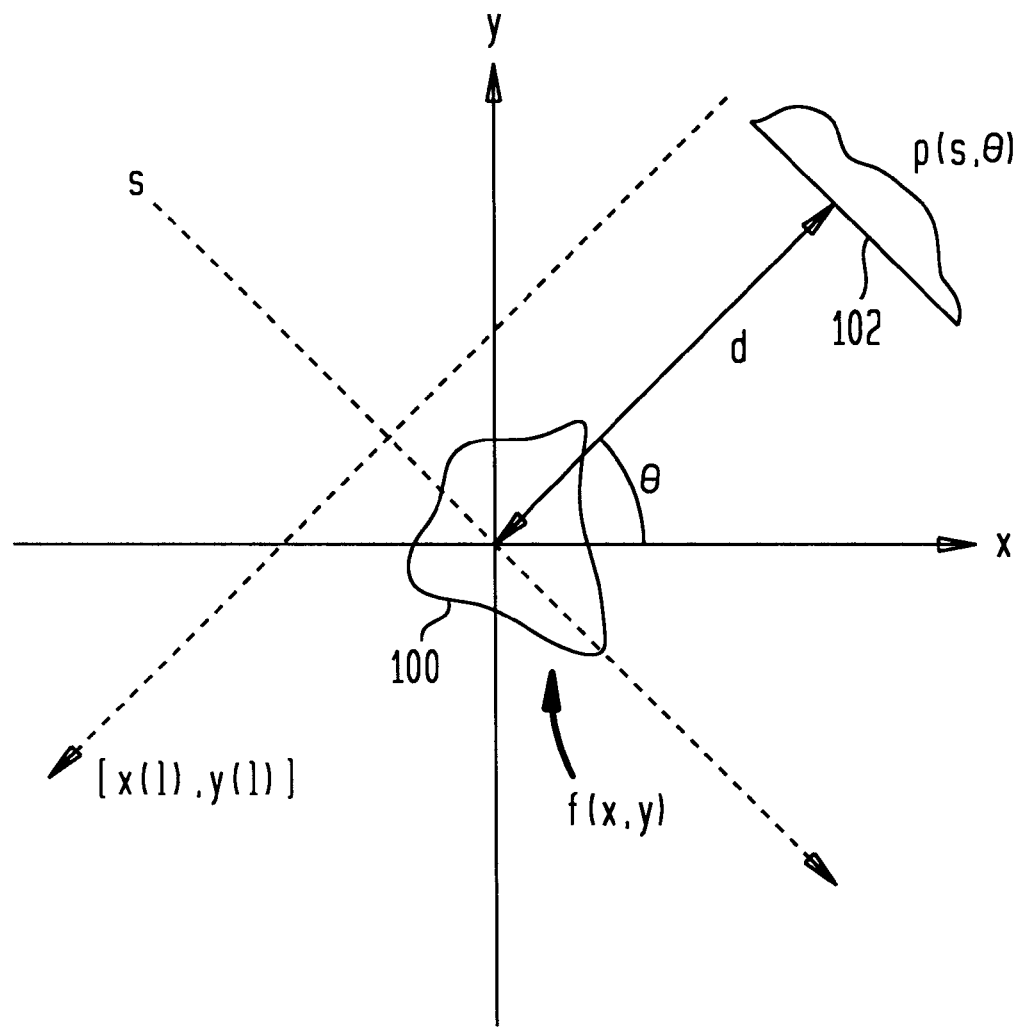
FIG. 1 shows the Radon transform representing a generalized line integral projection of a 2-D (or 3-D) function f(x,y,z) onto a line or plane.

The preferred embodiment of the invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the invention.

The preferred embodiment of the invention is described with reference to the figures where like reference numbers indicate identical or functionally similar elements. Also in the figures, the left most digit of each reference number corresponds to the figure in which the reference number is first used.

The detailed descriptions which follow are presented in part in terms of algorithms and symbolic representations of operations on data bits within a computer memory representing attenuation data or other information. These descriptions and representations are the means used by those skilled in the computer tomography and computer graphics arts to most effectively convey the substance of their work to others skilled in the art.

An algorithm is here, and generally, conceived to be a self-consistent sequence of steps leading to a desired result. These steps are those requiring physical manipulations of physical quantities, e.g., attenuation data. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, symbols, characters, attenuation data, display data, terms, numbers, or the like. It should be borne in mind, however, that all of these and similar terms are to be associated with the appropriate physical quantities or a discrete representation therein, and are merely used here as convenient labels applied to these quantities.

Further, the manipulations performed are often referred to in terms, such as comparing or summing or accumulating, commonly associated with mental operations performed by a human operator. No such capability of a human operator is necessary, or desirable in most cases, in any of the operations described herein that form part of the present invention; the operations are machine operations that are far too numerous for a human to perform, and thus carry out the invention. Useful machines for performing the operations of the present invention include computer graphics and imaging digital computers or other similar devices. In all cases the distinction between the method operations in operating a graphics computer and the method of computation itself should be recognized. The present invention relates to method steps and apparatus for operating a computer in processing electrical (e.g., attenuation data) or other (e.g., mechanical, chemical) physical signals to generate other desired physical signals.

The present invention also relates to an apparatus for performing these operations. This apparatus may be specifically constructed for the required purposes or it may comprise a graphics and imaging computer as selectively activated or reconfigured by a computer program stored in the computer. The algorithms presented herein are not inherently related to any particular computer or other apparatus. In particular, various graphics and imaging computers may be used with programs written in accordance with the teachings herein, or it may prove more convenient to construct more specialized apparatus/machines to perform the required method steps. The required structure for a variety of these machines will appear from the description below.

In the following description, several terms are used frequently, have specialized meanings in the present context, and are thus defined.

The term "attenuation data" is used herein to describe the signals incident to detectors within a CT scanner. Attenuation data is also referred to as projection data. Attenuation data for an entire single cross sectional (or slice) view of an object through many angular positions is represented in a data set called a sinogram.

II. The Radon and Inverse Radon Transform

A discussion of the mathematical basis of volume rendering and tomographic reconstruction is presented in this section. Described further below are efficient hardware texture mapping-based implementations for both tomographic reconstruction and volume rendering, according to the preferred embodiment of the present invention.

The most fundamental mathematical operation is the Radon transform and its inverse. As set forth below, the inventors have demonstrated that volume rendering is a generalized form of the Radon transform. Sabella, Upson and Keeler, Drebin et al., Westover, and Totsuka and Levoy, supra, describe conventional volume rendering.

As illustrated in FIG. 1, the Radon transform defines a mapping between an object 100 in physical object space (xy) and its projection space (s, θ). The object is defined in a Cartesian coordinate system by f(x,y), which describes the x-ray absorption or attenuation at the point (x,y) in the object at a fixed z-plane. Since the attenuation (data) is directly proportional to the volumetric density of the object at that spatial position, a reconstructed image of f(x,y) portrays a two dimensional non-negative density distribution.

The Radon transform can be thought of as an operator on the function f producing function p, and is given by:

$$p(s, \theta) = \int_{-\infty}^{\infty} f(x(l), y(l)) dl \quad (2)$$

The function p(s, θ) represents the line integral projection of f(x(l), y(f)), at angle θ, along direction s and the ray [x(l), y(l)], where:

$$x(f) = d\cos\theta + s\sin\theta + l\cos\theta$$

$$y(l) = -d\sin\theta - s\cos\theta + l\sin\theta$$

Note that this assumes that the projection, p, is d distance away from the object coordinate system's origin and that all the projection rays are parallel. This later assumption can be relaxed as described below. For the parallel ray case, FIG. 1 can be idealized as having a row of sensors parallel to distance s at a baseline 102 of the function p(s,θ) and a source of x-rays at position on the opposite side of object 100. (U.S. Pat. No. 4,222,104 describes a conventional CT system. The '104 patent is one of many patent directed to CT technology assigned to E.M.I. Limited.)

Figure 2:
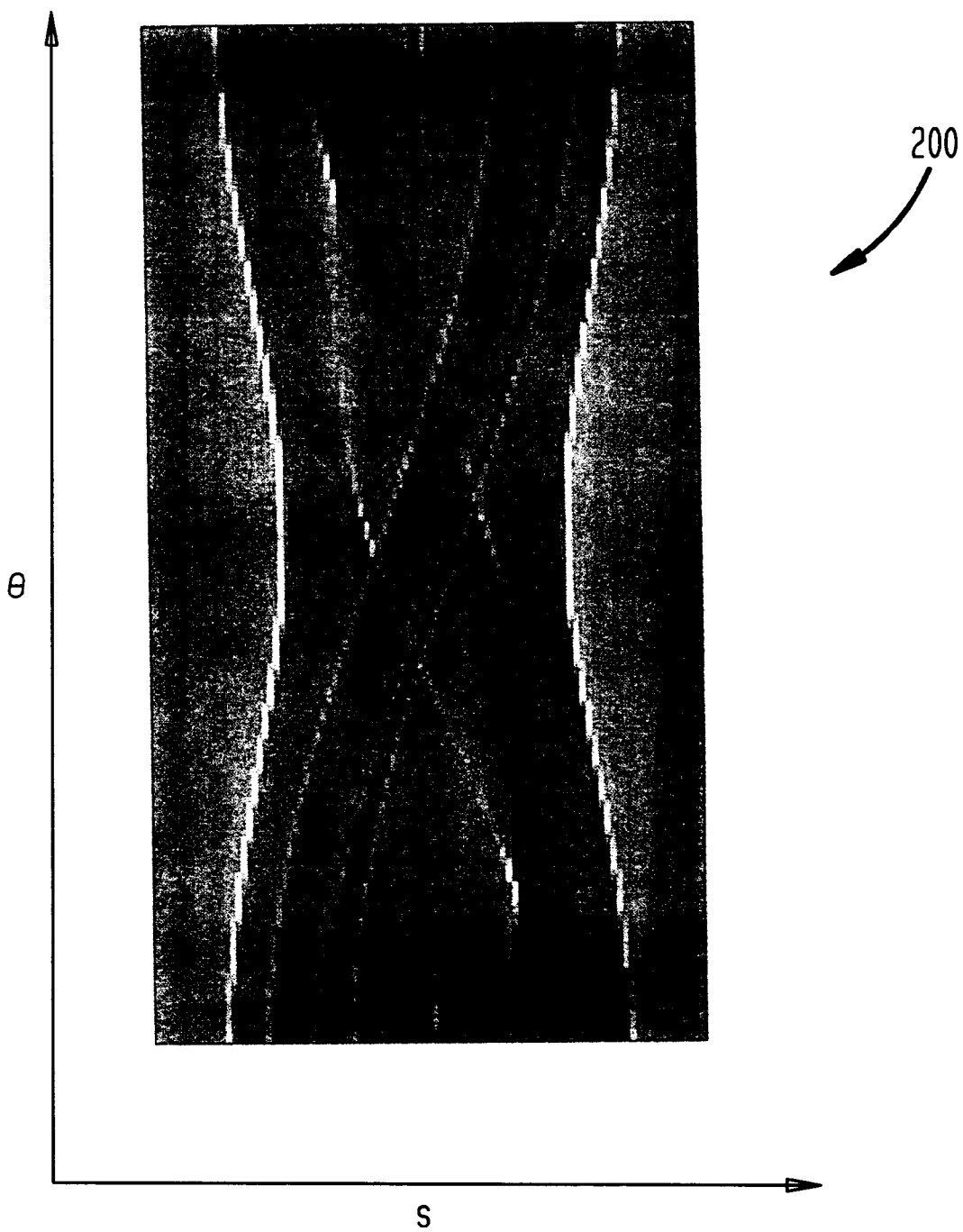
FIG. 2 shows an exemplary sinogram.

The function p(s,θ), when viewed as a two dimensional image, is known as a sinogram. FIG. 2 shows a sinogram 200 of a synthetic phantom image (see Russ, supra) of a test object with geometrical shapes of known densities. In this representation, direction, s, is mapped onto horizontal axis and angle θ is the vertical axis. It is known as a sinogram because a fixed point x,y in the object, f, will trace a sinusoidal path through the projection space, p, as shown in FIG. 2. Each horizontal slice of data in the sinogram represents the attenuation data measured by the row of detectors at a given value for angle θ.

The Fourier Slice Projection Theorem states that the inverse Fourier transform of a radial cross section of the Fourier transform of the object function, F, is equal to p. Stated another way, the Fourier transform of p is a radial cross section of F. (See, Russ, J., *The Image Processing Handbook*, CRC Press, 1992, pp. 339–365; Kak, A. and Slaney, M., *Principles of Computed Tomographic Imaging*, IEEE Press, 1988; Azevedo, S., "Model-based Computed Tomography for Nondestructive Evaluation," Ph.D. *Thesis*, UCRL-LR-106884, March 1991; and Totsuka and Levoy, supra).

The Fourier Slice Projection Theorem is more formally denoted as:

$$P(\varpi, \theta) = \int_{-\infty}^{\infty} p(s, \theta) e^{j2\pi\varpi s} ds \quad (3)$$

$$= \int_{-\infty}^{\infty}\int_{-\infty}^{\infty} f(x, y) e^{-j2\pi\varpi(x\cos\theta + y\sin\theta)} dx dy \quad (4)$$

$$F(u, v) = \int_{-\infty}^{\infty}\int_{-\infty}^{\infty} f(x, y) e^{-j2\pi\varpi(ux+vx)} dx dy \quad (5)$$

where P is the Fourier transform of the projection p, and F is Fourier transform of f.

By taking the inverse of F, f is derived as:

$$f(x, y) = \int_{-\infty}^{\infty}\int_{-\infty}^{\infty} F(u, v)e^{j2\pi(ux+vx)}du\,dv \quad (6)$$

Changing from a Cartesian to a polar coordinate system in the Fourier domain, so that $P(\omega\theta)=F(\omega\cos\theta, \omega\sin\theta)$ yields:

$$f(x, y) = \int_0^{2\pi}\int_0^{\infty} F(\varpi\cos\theta, \varpi\sin\theta)e^{j2\pi\varpi s}\varpi\,d\varpi\,d\theta \quad (7)$$

$$= \int_0^{\pi}\int_{-\infty}^{\infty} F(\varpi\cos\theta, \varpi\sin\theta)e^{j2\pi\varpi s}|\varpi|d\varpi\,d\theta \quad (8)$$

The coordinate system change which takes place when going from the Cartesian Fourier domain to the polar projection domain, means that the samples are concentrated in the center of the two dimensional Fourier space by the radial frequency, ω. This modulation is accounted for by the differential of area between polar and rectangular coordinates, given by $dxdy = \omega d\omega d\theta$. This can be removed through a weighting $|\omega|$ in the Fourier domain. This is equivalent to a convolution in the spatial domain, but is usually performed in Fourier domain to minimize computations. The shape of this filter in the Fourier domain is such that it has infinite spatial extent and, hence, makes spatial implementations of this filtering process computationally impractical.

Equation (7) can now be rewritten by substituting the two dimensional Fourier transform, F, with the equivalent Fourier transform of the projection P at angle θ, as follows:

$$\tilde{p}(s, \theta) = \int_{-\infty}^{\infty} P(\varpi, \theta)e^{j2\pi\varpi s}|\varpi|d\varpi \quad (9)$$

$$f(x, y) = \int_0^{\pi} \tilde{p}(s, \theta)d\theta \quad (10)$$

Here, $\bar{p}$, merely represents a filtered version of the projection has a form identical to that found in equation (1), that of a single integral of a scalar function. These two integral transforms can be represented in discrete form by:

$$p(s, \theta) \approx \Delta l \sum_{k=1}^{M} f(x(l_k), y(l_k)) \quad (11)$$

$$f(x, y) \approx \frac{\pi}{N}\sum_{k=1}^{N} \tilde{p}(s_k, \theta_k) \quad (12)$$

Note that both of these equations imply that the summands are resampled as the summation is taking place. This resampling is inherent in the coordinate system transformation implied by the projection operation of the Radon transform and its inverse. The resampling can be made more explicit by rewriting equations (10) and (11) as:

$$p(s_i, \theta_j) \approx \Delta l \sum_{k=1}^{M} f(x_k, y_k) \quad (13)$$

$$f(x_i, y) \approx \frac{\pi}{N}\sum_{k=1}^{N} \tilde{p}(s_k, \theta_k) \quad (14)$$

where $$x_k = d\cos\theta_j + s_i\sin\theta_j + l_k\cos\theta_j \quad (15)$$

$$y_k = -d\sin\theta_j + s_i\cos\theta_j + l_k\cos\theta_j \quad (16)$$

$$s_k = d\tan\left(\tan^{-1}\left(\frac{y_j}{x_i}\right) - \theta_k\right) \quad (17)$$

In particular, note that f and p in equations (12) and (13) respectively, are being discretely resampled as a function of the input parameters. Traditionally it has been this resampling and summation that takes the majority of time in the reconstruction and rendering process. (See, Azevedo, S. and Kak, A. and Slaney, M., supra.) A problem that is exacerbated when handling the full three dimensional case.

A. Orthographic Volume Rendering and the Generalized Radon Transform

The inventors have generalized the discrete form of the Radon transform of equation (12) to handle all single scattering volume rendering techniques according to the method of Kajiya, J., "The Rendering Equation," *Computer Graphics*, Vol. 20, No. 4, (August 1986; pp. 143–150) and Kajiya and Von Herzen, supra. This is done by multiplying the summand by a weighting term, $C_k$, as follows:

$$p(s_i, \theta_j) \approx \Delta l \sum_{l=k}^{M} c_k f(x_k f(x_k, y_k) \quad (18)$$

Here s represents a pixel in a scan line and θ the viewing position about the volume, f. The variations between different volume rendering algorithms focus on determining these weighting values and choosing an efficient mechanism for computing equation (18). A simple weighting scheme is to make $C_k$ be proportional to $l_k$ or $I_k^2$. This technique is widely used in computer graphics and is more commonly known as depth cueing. It has been used for volume rendering by Totsuka and Levoy, supra. However, most volume renderers, use a more complicated data dependent weighting scheme. The most common of which is defined by the over operator described in Porter and Duff, supra, and used in volume rendering by Drebin, supra. $c_k$ can be defined recursively from the definition of the over operator as:

$$c_0 = \alpha_0 \quad (18b)$$
$$c_1 = \alpha_0(1 - \alpha_1)$$
$$c_2 = c_1(1 - \alpha_2)$$
$$\vdots$$
$$c_k = c_{k-1}(1 - \alpha_k)$$

Since $c_k$ depends on all previous c's, most volume rendering algorithms perform this calculation iteratively front to back, or visa versa, computing $c_k$ implicitly as the value of p is summed. By looking at volume rendering as a generalized Radon transform the mathematical form of both the forward and inverse Radon transform are kept the same; implying that the same basic hardware primitives can be used to solve either problem with equal ease.

Before describing how to implement these algorithms, it is important to describe two other types of generalizations.

The first is fan beam reconstruction. The second is the three dimensional generalization of the fan beam reconstruction known as cone beam reconstruction, which is particularly interesting because it shows the perspective geometry found in the perspective form of volume rendering.

B. Fan Beam Reconstruction

Figure 3:
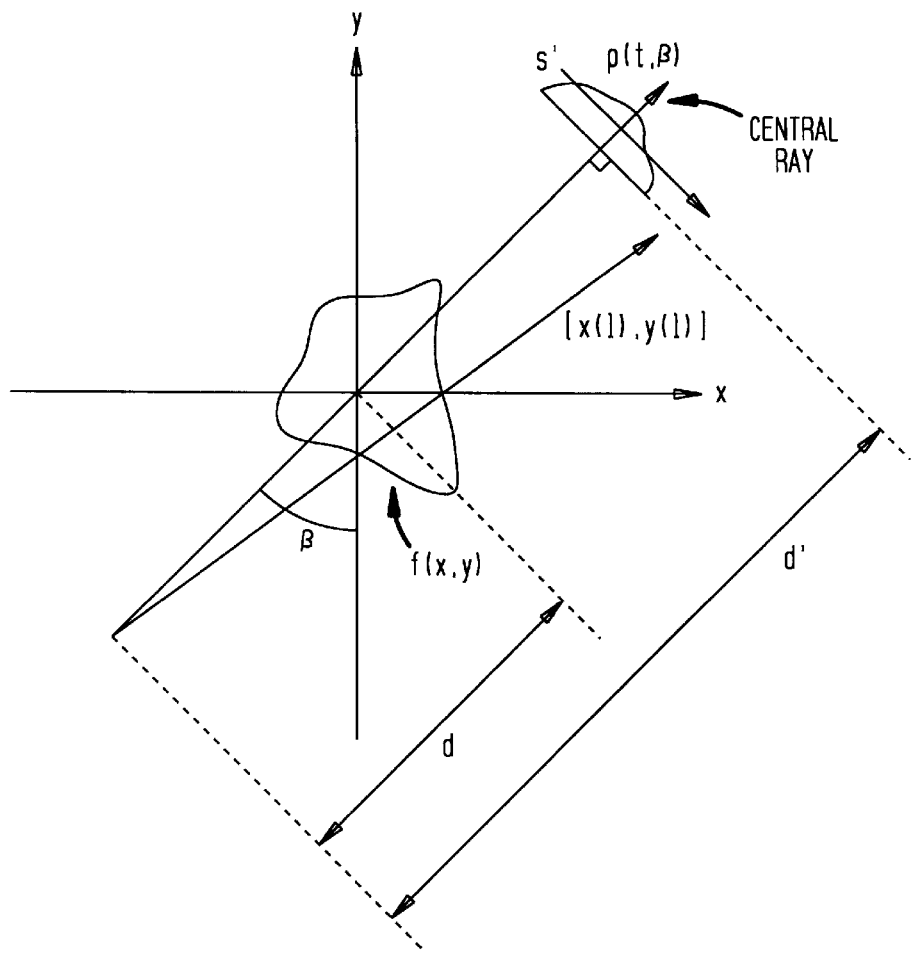
FIG. 3 shows a fan beam geometric reconstruction.

Parallel ray CT can be generalized to the fan beam case where there is a single source of the x-rays that go through the object onto a linear array of sensors as before. A fan bean geometric reconstruction is graphically depicted in FIG. 3. (Note that fan beam reconstructions usually come in two types: the curved equi-angular sensor configuration; or the equispaced sensor configuration. It is the later which is the focus of the preferred embodiment of the present invention, without loss of generality with regard to the former.)

There are two ways one can go about performing reconstruction using a fan beam data. The first and conceptually the simplest, is to take all the rays from all M projections and sort them into the appropriate parallel projection. This approach has a very serious draw back because constraints must be placed on the sampling angles and sensor angles so that the individual rays get sorted into parallel projections which are exactly parallel to the corresponding fan beam ray. Even if these constraints are met the resulting parallel projection data will not be evenly sampled in s, introducing additional artifacts in the resampling process.

The second approach is to utilize a direct method; let the detectors be located linearly in s' at distance d' from the source as shown in FIG. 2. First, d' is normalized by relocating the detector array to the origin by scaling:

$$s = s' \frac{d}{d'}.$$

The fan beam projection data must also be multiplied by a path length difference term, $$\frac{d}{\sqrt{d^2 + s^2}}.$$

After making these adjustments, the weighted projection data are convolved as before to yield $\bar{p}(s,\beta)$. The equivalence of the filtering used in both the parallel and the fan beam cases can be found in Azevedo, S. and Kak, A. and Slaney, M., supra.

There must also be an inverse projective distance squared normalization term. This will be explained later. It is given by $1/r^2$, where r is the distance relative to d along the central ray for point x,y in the object. After making these adjustments the fan beam equations are:

$$f(x, y) = \int_0^{2\pi} \frac{1}{r^2} \bar{p}(s, \beta) d\beta \quad (19)$$

$$f(x_i, y_i) \approx \Delta\beta \sum_{k=1}^{N} \frac{1}{r^2} \bar{p}(s_k, \beta_k) \quad (20)$$

III. Three Dimensional Reconstruction and Rendering

There are two primary ways in which one can reconstruct a three dimensional volume from CT data depending on how the data was acquired. Both the parallel and fan beam approaches described above assume that the sensor array is one dimensional, residing in a constant z-plane. Reconstructing a three dimensional volume can be done one z-plane at a time until all the slices are reconstructed. Likewise, one could volume render in this manner one scan line at a time using an inverse form of the fan beam formula. However, the more compelling case for both volume rendering and reconstruction occurs if the sensor or pixel array is a two dimensional plane. For volume rendering this is a more natural approach since the output of any volume renderer is necessarily a two dimensional array of pixels. For reconstruction it means that data can be gathered at a much higher rate.

A. Cone Beam Reconstruction

Figure 4:
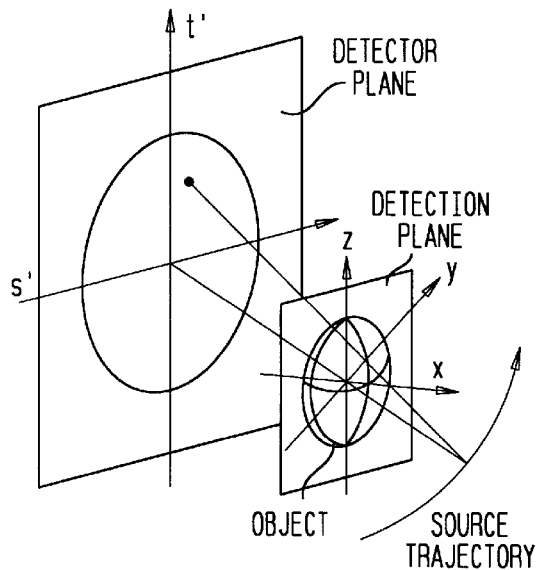
FIG. 4 shows a three dimensional configuration of a planer sensor array with a point source X-ray.

Consider the case of an X-Ray source that projects through a region of interest onto a rectangular grid of detectors. FIG. 4 shows a three dimensional configuration of a planer sensor array with a point source X-ray. Assume that the detector array and X-Ray source are fixed on a rotating gantry, which allows a cylindrical region of interest to be swept out. The projection data p (s',t',β) that can be measured by X-Ray detectors is:

$$p(s', t', \beta) = \int_0^{\sqrt{d'^2+s'^2+t'^2}} f(x(l), y(l), z(l)) dl \quad (21)$$

Here, s' and t' represent the detector coordinate variables in the detector plane d' from the source, at angle β about the object f(x,y,z); t is the parametric distance along the ray, {x(l),y(l),z(l)}. The cone beam can be thought of as fan beam tilted up or down in z by an angle γ. As with the fan beam, the detector distance is first normalized by scaling s' and t' by d/d'. The formulation for the cone beam is that of the fan beam, with exception that the fan beam rays now contain a z-component and the fan beam path length difference term becomes $$\frac{d}{\sqrt{s^2 + t^2 + d^2}}.$$

After convolution, the projection data are used to calculate the three dimensional volume data in Cartesian coordinates by the operation of weighted backprojection. The weighting factor is determined by inspecting the relationship of the three dimensional pixel grid x,y,z to the projective coordinate system of an individual projection. This coordinate system is composed of the s and t indexes of the normalized projection data set and the perpendicular coordinate r which represents the direction from the source to the detector array. These three form a projective coordinate system in that rays emanating from the source to the detector are considered to be at a constant s,t position. The projective coordinate system can be transformed into a Cartesian coordinate system by multiplying the s and t coordinates by r to yield (rs,rt,r). (See, Segal, M. et al., "Fast Shadows and Lighting Effects Using Texture Mapping," *Computer Graphics*, Vol. 26, No. 2, July 1992, pp. 249–252.) This Cartesian system can be transformed to the three dimensional volume grid by a standard three dimensional transformation matrix.

It is now apparent that the volumetric differential in the projective coordinate system of the beam is related to the three dimensional volumetric differential by:

$$dxdydz = r^2 dsdtdr$$

Furthermore, the weighting factor for the fan beam is also $1/r^2$ because the fan beam is simply the cone beam with t=z=0; the differential is unchanged.

The cone beam equations are thus:

$$f(x, y, z) = \int_0^\pi \frac{1}{r^2} \tilde{p}(s, t, \beta) d\beta \qquad (22)$$

$$f(x_i, y_j, z_k) \approx \frac{2\pi}{N} \sum_{k=1}^N \frac{1}{r^2} \tilde{p}(s_k, t_k, \beta_k) \qquad (23)$$

B. Perspective Volume Rendering Using the Generalized Radon Transform

The generalized Radon transform can be further generalized to the three dimensional perspective case. Like in the cone beam analysis, one has to take into account both the perspective weighting, due to the off center traversal of $\{x(l), y(l), z(l)\}$, and the $1/r^2$ volumetric differential term. With this in mind equation (1) can be rewritten as:

$$p(s, t) = \frac{d}{\sqrt{s^2 + t^2 + d^2}} \int_0^{l_{max}} \frac{1}{r^2} c(l) f(x(l), y(l), z(l)) dl \qquad (24)$$

Where, c(l) is the continuous form of the weighting term introduced above and $1/r^2$ is the same projective weighting as described above. p is the image plane for a projective (s, t, r) view from any arbitrary direction. The perspective weighting term is necessary because the sensor/image plane resides in a Cartesian coordinate system. Since the projective weighting term is constant with respect to s and t it can be performed as a post multiply on the projections, as given by:

$$p(s, t) \approx \frac{d}{\sqrt{s^2 + t^2 + d^2}} \frac{d'}{M} \sum_{k=1}^M \frac{1}{r^2} c_k f(x_k, y_k, z_k) \qquad (25)$$

Notice how mathematical equations (23) and (25) are of the same form: that of a weighted sum. In particular both sums are being weighted by a projection term. This similarity means that both techniques are ideally suited for implementation on high performance true three dimensional texture rendering hardware. It will now be shown that the difficulty of this problem merits hardware acceleration.

IV. Computational Complexity

The computational complexity implied by the discrete form of the Radon transform and the filtered backprojection is sufficiently large that most CT scanners include specialized hardware to perform these tasks. However, two trends are rapidly changing CT medical imaging. One is that increasing pressure to reduce costs is driving a transition from special purpose hardware to general purpose "off the shelf" hardware. The second is that technological advances are increasing the quantity and quality of the data that can be collected for use in diagnosis.

These trends call for a computer system architecture which addresses data visualization and reconstruction in a general purpose way. This is not, however, the same as saying that the problem must be solved by a von Neuman type processor of sufficient performance. Although that may someday be possible it will be quite far in the future. Furthermore, it will always be true that if sufficient volume is available to drive economics, a dedicated processor will outperform and/or cost less than a general purpose processor which can accomplish the same function.

A typical modern generation CT scanner has on the order of 512 detectors and is capable of taking 1024 projections per second. For a fan beam reconstruction each data set must undergo Fast Fourier Transformation (FFT), a multiply, and inverse FFT to accomplish the "bow tie", $|\omega|$, convolution operation. To prevent aliasing the data set must be extended to 1024. (See, Azevedo, S. and Kak, A. and Slaney, M., supra.) The FFT will then consist of 10 sets of 512 butterfly calculations, each of which is a complex multiply and two complex adds or four simple multiplies and six simple additions. Thus the FFT will require 10*10*512 floating point operations or 50 KFLOPs (floating point operations per second). This is followed by a complex multiplication of 6 KFLOPs and an inverse transform of 50 KFLOPs for a total of 106 KFLOPs for a single projection. Multiplying this result by the 1024 projections yields 106 MFLOPS.

A. Backprojection and Radon Transform Complexity

Although modern floating point processors can now handle such magnitude of calculations there is little spare performance available for the additional required operations. For example, convolved projection data must be backprojected to create an image. To create a 512 squared image the contribution to each pixel of each convolved projection must be calculated and summed. It is this operation that is the most costly in the reconstruction process.

For each projection each pixel's projection onto the detector data set must be calculated. The data must then be resampled (usually using linear interpolation) and summed to accumulate the total for that pixel. Assuming a display of 256K pixels, these operations will need to be performed 256 million times per second. Each operation requires several operations as well as memory fetches.

Present day CPUs are nowhere near being able to attain these performance requirements. However, a general purpose imaging and graphics architecture, which is available today, can implement these algorithms in the one to two second range.

This architecture is truly general purpose, because it can be used in a wide variety of situations permitting economic benefit of the economy of scale required to amortize continuing evolutionary development and practical manufacturability. The same architecture can be economically used for visual simulation applications as well as photogrammetry, reconnaissance imaging, and advanced design. The Silicon Graphics, Inc., (Mountain View, Calif.) Reality Engine architecture, is such an architecture. It comprises a large source image memory connected to the frame buffer through a high performance resampling engine. All of this hardware is under the direct control of a geometry engine subsystem providing floating point capacity of 1.2 GFLOPS.

Figure 5:
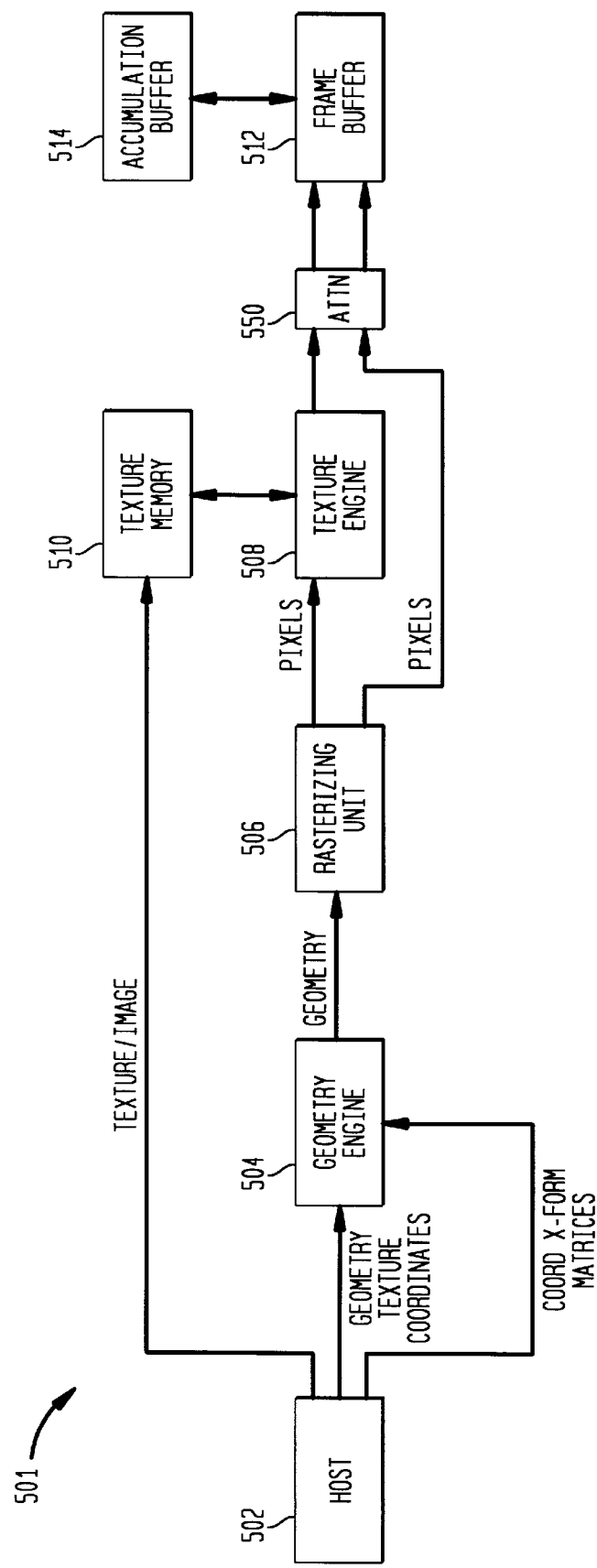
FIG. 5 is a block diagram of a computer system according to a preferred embodiment of the present invention.

V. General Graphics and Imaging Computer Based Reconstruction and Volume Rendering The present invention uses a generalized imaging and graphics computer (such as the "Reality Engine" computer available from Silicon Graphics Inc. in Mountain View, Calif. for example) to perform the rapid reconstruction and volume rendering of image data acquired from x-ray or similar imaging sensors. FIG. 5 is a block diagram of such a generalized imaging and graphics computer according to a preferred embodiment of the invention. It should be understood that the invention is not limited to the computer system shown in FIG. 5.

The computer 501 shown in FIG. 5 includes a host computer 502 implemented using a generalized CPU (central processing unit), e.g., a MIPS 4400 microprocessor. In addition to performing conventional functions (such as performing generalized input/output and computations), the host computer 502 operates to control the devices and dataflow of the invention, as discussed below.

A geometry engine 504 (that may in practice be one or more geometry engines) is preferably implemented using a plurality of high performance vector processors, e.g., the Intel i860. The geometry engine 504 takes a floating point four tuple (a vector) and multiplies it by a generalized four by four projective/affine transformation matrix. The geometry engine 504 may perform additional functions, such as packing and unpacking data to and from blocks 506–512 (described below).

A rasterizing unit 506, also called a scan conversion unit, is preferably implemented using application specific integrated circuits (ASICs), having the functionality described herein. (It is noted that the ASICs discussed herein are contained in the "Reality Engine" computer publicly available from Silicon Graphics, Inc.) The rasterizing unit 506 may alternatively be implemented using a combination of generalized hardware operating in accordance with software have the functionality described herein. The rasterizing unit 506 takes a triangle whose vertices are specified using two sets of coordinates given by the two 4-tuples $(x,y,z,w)$ and $(s,r,t,q)$. The rasterizing unit 506 subdivides the triangle on to a discrete grid such that the individual elements of the two four tuples are computed for each discrete element (called screen pixels) in the grid. This means each coordinate in each of the two 4-tuples is individually processed such that two new 4-tuples are computed per screen pixel. This set of new 4-tuples are represented by $(x',y',z',w')$ and $(s',r',t',q')$.

The rasterizing unit 506 completes its work by dividing each four tuple by its fourth element, thusly $(x'/w',y'/w',z'/w',1)$ and $(s'/q',r'/q',t'/q',1)$. This is known as the projective divide operation, which moves the coordinates from a homogeneous coordinate system to a Euclidean coordinate system. Projective divide is well known to persons skilled in the relevant art(s).

A texture engine 508 is preferably implemented using application specific integrated circuits (ASICs), having the functionality described herein. The texture engine 508 may alternatively be implemented using a combination of generalized hardware operating in accordance with software have the functionality described herein. The texture engine 508 takes pixels from the rasterizing unit 506 and a mapping description from the host 502, the latter of which describes the address mapping between screen pixels and that of texture memory. The texture engine 508 computes discrete texture memory addresses from its inputs, and hands these discrete texture memory addresses to a texture memory 510. The texture memory 510 stores images (also known as textures). The texture memory 510 returns pieces of image data based on these addresses passed to it from the texture engine 508. The texture engine 508 takes these pieces of image data in conjunction with $(s'/q',r'/q',t'/q',1)$ and computes via interpolation (preferably linear interpolation, although other interpolation schemes could alternatively be used) a new output image value.

The texture memory 510 receives images from the host 502 via the geometry engine 504. The geometry engine 504 may perform intermediate pixel processing operations on such images before transferring them to the texture memory 510. Such intermediate pixel processing operations include packing and unpacking, and filtering operations.

The texture memory 510 is preferably implemented using a combination of ASIC logic (that performs address translation) and conventional memory.

An attenuation unit 550 is preferably implemented using ASICs, although other implementations may be used. The attenuation unit 550 takes the pixel value results from the texture engine 508 and one of the coordinate elements from either $(x'/w',y'/w',z'/w',1)$ or $(s'/q',r'/q',t'/q'1)$, e.g., $r'/q'$. The host 502 specifies which coordinate element is selected. The attenuation unit 550 uses this coordinate element to compute an attenuation factor which is used to modulate the incoming pixel value.

A frame buffer 512 is preferably implemented using a combination of ASIC logic (that performs the functions described herein) and conventional memory. The frame buffer 512 takes pixel value information coming from the rasterizing unit 506 and the attenuation unit 550 and stores it in its memory. The frame buffer 512 can optionally blend the incoming pixel values with data already stored frame buffer 512. Blending is the general operation given by the following equation:

(incoming pixel) *(incoming factor)OP(frame buffer pixel)*(frame buffer factor)

where OP (operation) includes, but is not limited to, addition, multiplication, minimum, and maximum. The incoming factor can be one of the following: the frame buffer pixel, a constant, negative the frame buffer pixel, etc. Similarly, the frame buffer factor can be one of the following: incoming buffer pixel, a constant, etc.

An accumulation buffer 514 is preferably implemented using a combination of ASIC logic (that performs the functions described herein) and conventional memory. The accumulation buffer 514 can be instructed by the host 502 to take the contents of the frame buffer 512 and transfer it to its own memory. In doing so, it can optionally modulate and/or bias the incoming data with one or more scalar values. Upon input transfer, the accumulation buffer 514 sums the incoming data with the data at the respective destination memory locations such that the destination memory locations are left with these respective sums. Also, the accumulation buffer 514 can be instructed by the host 502 to move contents from its memory back to the frame buffer 512. In doing so, it can optionally modulate and/or bias the incoming data with one or more scalar values.

The host 502 can instruct the frame buffer 512 via the geometry engine 504 to return its contents through the geometry engine 504 into the host 502 memory. As described above, the geometry engine 504 may perform intermediate processing of this information before passing it to the host 502.

The computer 501 operates to backproject and volume render projection data and volume data, respectively. The backprojection operation and the volume rendering operation may be performed independently of one another, or may be performed sequentially. When performing either backprojection or volume rendering, the computer 501 performs the following operations: texture maps at least one of the projection data and volume data onto a polygon; renders the polygon to generate an intermediate result; and accumulates the intermediate result with prior intermediate results to thereby generate a final reconstruction. It is noted that these operations are not necessarily performed in the order presented above. Instead, their ordering is dependent on the specific implementation. Backprojection and volume rendering shall now be described relative to the preferred embodiment.

VI. Backprojection

Backprojection shall now be described with reference to a flowchart 601 shown in FIG. 6.

The discrete form of the inverse radon transform suggests a spatial implementation of this equation known as filtered backprojection. A technique to implement this concept is broken up into two separate passes. The first pass filters, p, to produce, $\bar{p}$, as is well known (this invention is not dependent on this filtering step) (see FIG. 2, which shows an example of $\bar{p}$. The second pass performs the backprojection operation of the present invention. This is accomplished by iteratively smearing $\tilde{p}$ back across object space (xy), at discrete angles of θ, where each θ is separated by a fixed or variable amount denoted by Δθ. This process is evident in the following pseudo-code implementation:

$$\tilde{p} \leftarrow \text{Filter}(p)$$
$$\text{For } \forall\, i \text{ and } j \text{ pixels}$$
$$f(x_i, y_j) \leftarrow 0$$
$$\text{For } \forall\, k \text{ angles in } \theta$$
$$f(x_i, y_j) \leftarrow f(x_i, y_j) + \tilde{p}(s_k, \theta_k)$$
$$f(x_i, y_j) \leftarrow f(x_i, y_j) * \Delta\theta.$$

After each backprojection the values are summed to complete the calculation of equation (4). Traditionally the backprojection took orders of magnitude longer to compute than the filtering of p.

Using the present invention, image reconstruction that previously relied on specialized hardware designed only to perform this task can now be achieved.

Figure 6:
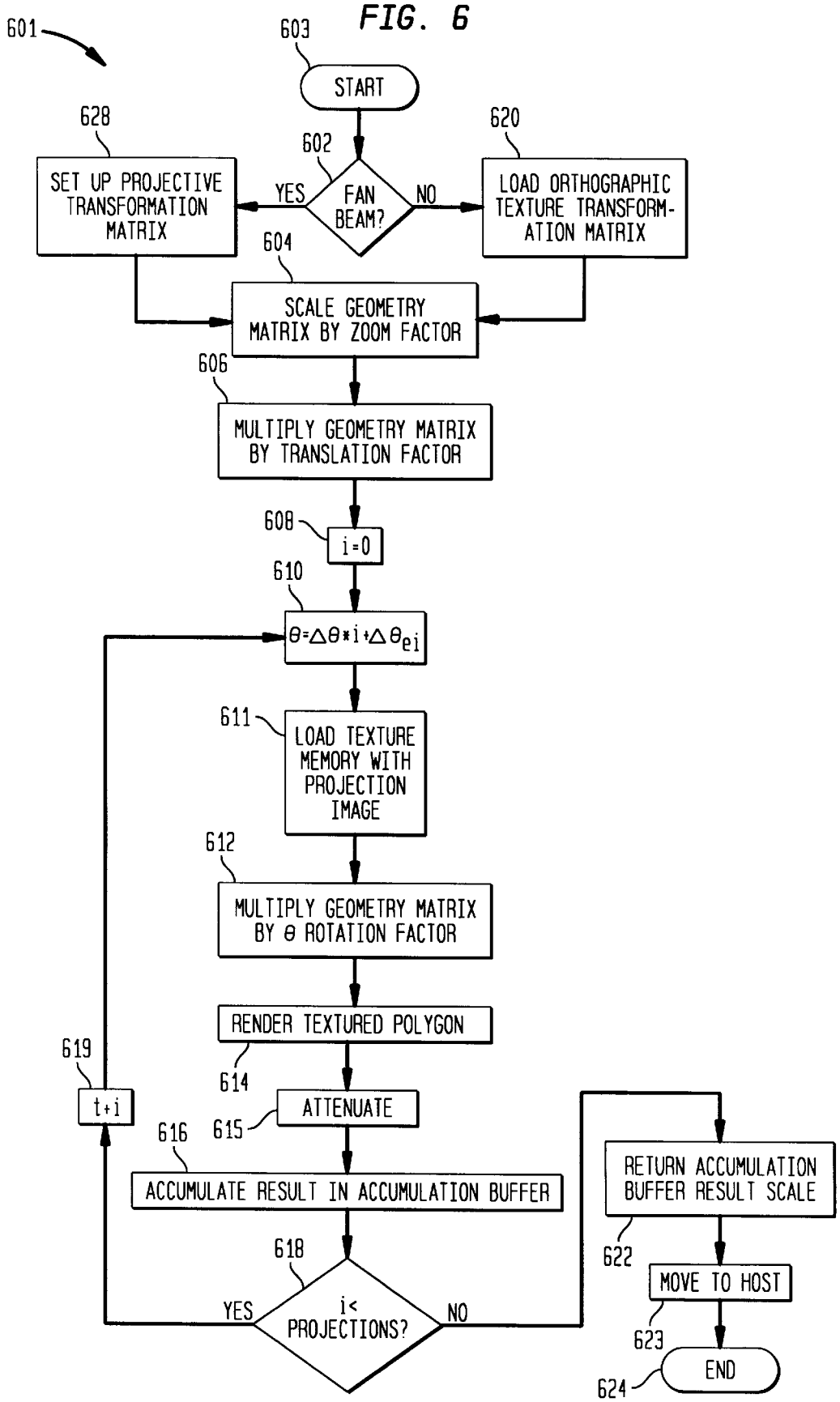
FIGS. 6 and 7 are flowcharts depicting the preferred operation of the invention.

The control logic for computer 501 is detailed in FIG. 6. At a first step 602, the host 502 determines the image acquisition geometry, e.g., fan beam or parallel beam. (It should be understood that the invention also operates with cone beam, spiral beam, etc., geometries. The operation of the invention when working with these are similar to that described herein, as will be apparent to persons skilled in the relevant art(s).)

Depending on the beam geometry, a specific projective transformation matrix is established in step 628 (for fan beam) or step 620 (for parallel beam). (Generally speaking, beam geometry includes parameters such as the beam's orientation, the degree of symmetry of the beam, the size of the beam, and whether a localized portion of the beam is to be used.) Clearly, there is such a branch for each of the beam geometries. The projective texture transformation matrix controls the warping of the texture coordinates in an affine manner to properly map the projection data containing the image sinogram.

At step 604, the geometry engine 504 may scale or zoom the transformation matrix (also called the geometry matrix) for purposes of scaling and zooming the final result. Similarly, in step 606, the geometry engine 504 may multiply the transformation matrix by a translation factor specified by the host 502 to accomplish a translation of the final result.

In step 608, the host 502 initializes an iteration counter i to some starting value, preferably 0.

In step 610, the host 502 computes a new value θ from the iteration counter i and the inter-angular spacing Δθ. Optionally, an error term $\Delta\theta_{ei}$ can be included at this point.

In step 611, using θ, the host 502 loads texture memory 510 with all or part of $\tilde{p}$ relating to θ.

In step 612, the geometry engine 504 multiplies the translation matrix by a θ rotating factor. This orients the particular projection at angle θ so that when it is smeared back in step 614 it is done so at the proper angle.

In step 614, the computer 501 renders the textured polygon. This step represents the smearing (or backprojecting) of projection data. This step shall now be described with reference to the fan beam geometry, but the following description is also applicable to other beam geometries.

Accordingly to the preferred embodiment, in step 614 the host 502 assigns to each vertex of the circular polygon a spatial coordinate (x,y, 1, 1) and a texture coordinate (s,1,1,q). The s coordinate is the orthographic or parallel mapping of that vertex onto the projection/sensor array. The q coordinate is the distance from the x-ray source. The circular polygon is specified as a strip of adjacent triangles.

The geometry engine 504 multiplies each spatial and texture coordinate of the circular polygon by the geometry transformation matrix and the texture transformation matrix, respectively. The geometry engine 504 subdivides the circular polygon into a set of triangles. The rasterizing unit 506 scan converts each triangle in a manner described above.

The rasterizing unit 506 iterates from one output pixel to the next in scanline order over all coordinates independently in a linear fashion, as described above. Note that the linearity of these coordinates over the triangle should be obvious to those skilled in the art.

The rasterizing unit 506 takes each iterated coordinate on a per output pixel basis and divides by q to give s', as described above. This division, performed for each output pixel, turns the parallel geometry into a projective geometry. Of course, this functionality will vary according to beam geometry, as indicated above.

The texture engine 508 uses s' to index the projection data in the texture memory 510. This indexing is done as described above. Since s' may fall between two projection/sensor values the texture engine 508 will linearly interpolate the sensor values resulting in the output pixel value, as described above.

In step 615, the attenuation unit 550 attenuates the output pixel value as a function of the q coordinate. Again, note that this attenuation is subject to specific beam geometry.

In step 616, the output pixel result is stored in the frame buffer 512 and moved to the accumulation buffer 514. This step 616 represents the summing process described above in equation 12.

The process of steps 610, 611, 612, 614, 615, and 616 is repeated for each scanner position angle represented by the various values of 0 (whether or not to re-iterate is determined in step 618). During each iteration, the value of i is incremented by the host 501 as represented in step 619.

This iterative process stops when the counter i reaches the number of projections (step 618). At that point, in step 622, the summed values in the accumulation buffer 514 are moved from the accumulation buffer 514 into the frame buffer 512 during which time the appropriate scale and bias is given to the accumulation buffer 514 to normalize the data. The normalization is a function of the averaging process of equation 12 and the fixed point arithmetic implemented by the accumulation buffer 514. The results in the frame buffer 512 are optionally moved to the host 502 in step 623.

VII. Volume Rendering

Figure 7:
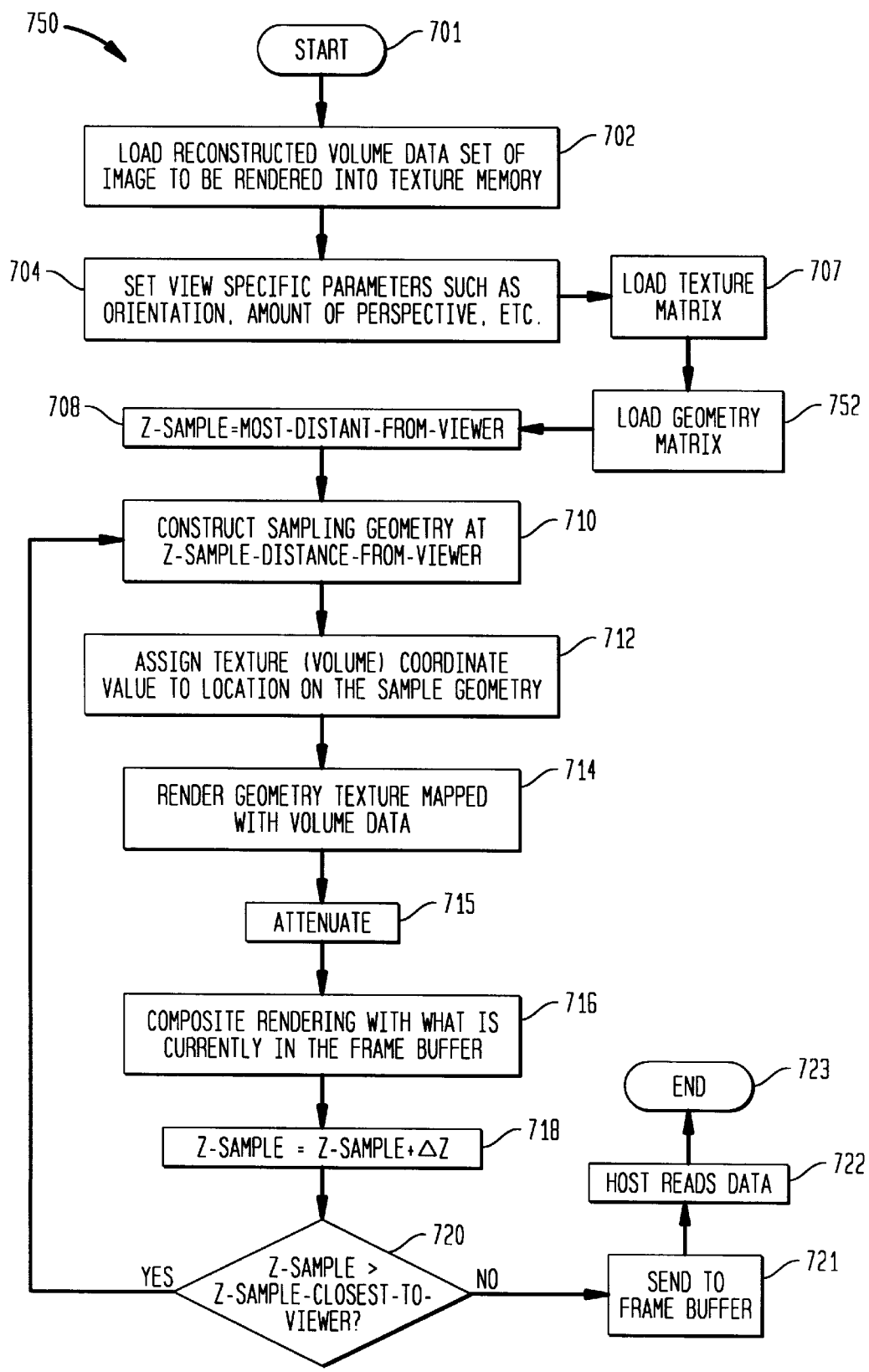

As is well known, most volume rendering algorithms come in one of two types: either backwards projecting or forwards projecting. The backwards projecting or ray tracing approach solves equation (24) by summing along the ray {x (l),Y(l),z(l)}. A forwards projecting technique loops over all values of f in back to front order finding the appropriate screen coordinate to sum into. The approach according to the present invention is a hybrid of these two, and is represented in FIG. 7. The pseudo-code for accomplishing the steps for rendering a reconstructed image volume data step using the texture mapping method detailed above is as follows:

For vk starting at the image plane and going some fixed distance L Intersect a slicing plane at $I_k$ parallel to p and trilinearly interpolate f Blend (weighted sum) the texture mapped slice into framebuffer, p (included in the blend is Δl weighting)

Normalize p by $$\frac{d}{\sqrt{s^2 + t^2 + d^2}}.$$

The final normalization is necessary, as was mentioned above, to handle the path length difference for off center pixels.

Referring now to FIG. 7, at step 702, all or part of a volume data set is loaded into texture memory 510 via the geometry engine 504, the latter of which may perform filtering or filtering and other operations, as described above. It should be understood that the volumetric data represents any type of volume data, including that generated by the previously-described process. The image volume data can be loaded as either a fall data set corresponding to an entire scanned object, or subsets of the reconstructed volume data can be loaded corresponding to certain portions of a scanned image. This capability allows efficient use of texture memory 510 which has a limited capacity. Loading and processing subsets of the reconstructed volume data enables the present invention to render scanned objects with a complete data set that would exceed the texture memory 510.

At a step 704, parameters are specified by the host 502 and used to determine how the rendered image volume will be computed. Examples of these parameters include image orientation, perspective, field of view, location of light source, and data features.

In step 707, the texture coordinate matrix is loaded into the geometry engine 504 by the host 502. This matrix is a function of some of the previously specified parameters including perspective and field of view.

In step 752, the host 502 loads a geometry matrix into the geometry engine 504. Again, this geometry matrix is a function of the previously specified parameters including orientation, scale, and translation. The construction of these two matrices are generally well known to persons skilled in the relevant art(s).

In step 708, the host 502 sets the Z-plane sampling range to correspond to the farthest point on the volume with respect to the eye of an observer viewing the rendered image.

In step 710, a polygon is constructed (by the host 502) perpendicular to the viewer's line of sight, i.e., parallel to screen space. It is understood that this planar geometry could be represented by other geometries such as partial cylinders or hemispheres. These pieces of geometry represent sampling planes, cylinders, or spheres at some fixed point within the volume (i.e., slices through the volume). The polygon or polygon mesh vertices are specified with geometric coordinates (x,y,z,l).

At step 712, texture coordinates are specified by the host 502 for each vertex which make up the slice polygon. The texture coordinates, like the geometry coordinates, are specified on a per vertex basis and are given by (s,t,r,l). Note that in cases for non-planar sampling slices, the polygons are in fact a polygonal mesh and the texture coordinates must be defined for each of these mesh points. The texture coordinates represent indices or positions into the volumetric data, effectively tying the geometric representation of the volume to the data.

At step 714, the computer 501 maps the volume data to the previously described geometry. This step represents the sampling of the volume as is done in ray tracing, except that unlike conventional ray tracing implementations, all rays are computed simultaneously for fixed distance represented by the z sample distance.

Accordingly to the preferred embodiment, in step 714 the geometry engine 504 multiplies each spatial and texture coordinate of the polygon by the geometry transformation matrix and the texture transformation matrix, respectively. The geometry engine 504 subdivides the polygon into a set of triangles. The rasterizing unit 506 scan converts each triangle in a manner described above.

The rasterizing unit 506 iterates from one output pixel to the next in scanline order over all coordinates independently in a linear fashion, as described above. Note that the linearity of these coordinates over the triangle should be obvious to those skilled in the art.

The rasterizing unit 506 takes each iterated texture coordinate on a per output pixel basis and divides by z to give (s',t',r') as described above. This division, at the per output pixel level, turns the parallel geometry into a projective pixel geometry. Of course, this functionality will vary according to the host specified parameters as indicated above.

The texture engine 508 uses (s',t',r') to index the volume data in the texture memory 510. This indexing is done as described above. Since (s',t',r') may fall between eight volume data values, the texture engine 508 will linearly interpolate the volume values resulting in the output pixel value, as described above.

In step 715, the attenuation unit 550 modulates the output pixel value as a function of the z coordinate.

In step 716, the modulated result is stored in the frame buffer 512 and blended with values already in the frame buffer 512. This blending represents the weighted summing evidence by equation 25.

To render the entire volume, it is necessary to repeat the above steps 710–716 at different z values in a back to front fashion. Thus, in step 718, the z sample value is incremented by a fixed or variable amount Δz.

The process of steps 710–718 is repeated until the z sample reaches a point in the volume that is closest to the viewer (step 720). Once the z sample reaches a point in the volume that is closest to the viewer, then in step 721 the host 502 can send to the frame buffer 512 a normalization image which modulates what is already in the frame buffer 512. This normalization represents the following term from equation 25:

$$\frac{d}{\sqrt{s^2 + t^2 + d^2}}$$

In step 722, the host 502 can optionally read data from the frame buffer 512 back to the host 502 via the geometry engine 504 (that may perform filtering, packing, unpacking, etc.).

VIII. Performance Results

The hardware accelerated algorithms for volume rendering and reconstruction result in formidable performance increases. All timing measurements were performed on a four Raster Manager (RM) Reality Engine Onyx system with a 150 Mhz R4400 CPU (manufactured by Silicon Graphics, Inc.). Since both the reconstruction and volume rendering algorithms are a linear function of the fill rate, removing RMs affects performance in linear manner.

The parallel beam reconstruction algorithm has been implemented and results indicate roughly 10–100 times speed improvement over a CPU based implementation. The reconstruction of a 512×804 sinogram into a 512×12 reconstruction space normally takes over 20 minutes to reconstruct using a CPU based algorithm. The hardware implementation performs the same task in 2.1 seconds, not including the time it takes to filter p.

The fan beam case shows similar results. Since the cone beam algorithm is merely a 3-D extension of the 2-D case, the same level of performance increase over CPU implementations is realized.

Both the perspective and parallel plane volume rendering algorithms have been implemented to render a 512×512×64 8bit volume into a 512×512 window in 0.1 seconds. This time includes performing the trilinear interpolation implied by the arbitrary slicing of the volume by the sampling plane. It also includes on-the-fly density to RGB α (alpha) color look up transfer functions. Since the planar sampling described in section V is arbitrary and oblique with respect to the overall volume, it is trivial to provide for arbitrary half-plane slicing. When coupled with arbitrary hardware clipping planes as provided by the graphics hardware it is possible to do both volume rendering and slicing at the same time with no performance degradation. The Reality Engine supports up to six concurrent arbitrary clipping planes (in addition to the six viewing frustum clipping planes).

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents. All cited publications in the above description are incorporated herein by reference.

What is claimed is:

1. A method, for use in a computer system, for back projecting and volume rendering of projection data and volume data respectively, comprising the steps of:
   (1) texture mapping at least one of the projection data and volume onto a polygon;
   (2) rendering the polygon to generate an intermediate result; and
   (3) accumulating the intermediate result with prior intermediate results to thereby generate a final reconstruction.

2. The method according to claim 1, wherein said step of texture mapping comprises the steps of:
   (1) loading all or part of at least one of the projection data and the volume data into texture memory;
   (2) setting up texture memory address mapping; and
   (3) setting up texture interpolation parameters.

3. The method according to claim 1, wherein said step of rendering said polygon comprises the steps of:
   (1) specifying, by a host, geometric and texture coordinates for each vertex of the polygon;
   (2) transforming, by a geometry engine, the texture coordinates based on at least one of a backprojection viewing geometry and a volume viewing geometry;
   (3) subdividing, by the geometry engine, the transformed texture coordinates of the polygon into triangles;
   (4) rasterizing, by a rasterizing unit, the triangles into screen aligned pixels;
   (5) mapping, by a texture engine, the screen aligned pixels to texture memory addresses;
   (6) interpolating, by the texture engine, texture memory values based on the texture memory addresses;
   (7) modulating, by the texture engine and a texture memory, the interpolated texture memory values with a color of the polygon to produce a result; and
   (8) storing the result of step (6) into a frame buffer memory.

4. The method according to claim 1, wherein said the of accumulation comprises the steps of:
   (1) transferring values from at least one of
       (i) one part of the frame buffer to another part of the frame buffer, and
       (ii) to and from some further section of the computer system; and
   (2) at least one of weighting, scaling, and biasing those values at least one of during, before and after the transferring step.

5. The method according to claim 3, wherein the projection data includes at least one of sinogram or volumetric data.

6. The method according to claim 5, wherein the sinogram includes parallel beam data.

7. The method according to claim 5, wherein the sinogram includes fan beam.

8. The method according to claim 5, wherein the sinogram includes cone beam data.

9. The method according to claim 5, wherein the sinogram includes spiral fan beam data.

10. The method according to claim 5, wherein the sinogram includes spiral cone beam data.

11. The method according to one of claims 7, further comprising the step of performing per output pixel projection texture coordinate division.

12. The method according to one of claims 7, further comprising the step of performing an arbitrary amine transformation on the texture coordinates.

13. The method according to claim 3, wherein the volumetric data includes at least one of (i) data reconstructed from sinograms, (ii) data obtained using physical sensors, and (iii) artificially created data.

14. The method according to claim 13, further comprising the steps of performing per output pixel projection texture coordinate division.

15. The method according to claims 13 and further comprising the step of performing an arbitrary affine transformation on the texture coordinates.

16. The method according to claim 1, further comprising the steps of using a general purpose computer graphics and imaging computer to perform said steps (1)–(3).

17. The method according to claim 1, further comprising the step of displaying the results of said steps (1)–(3).

18. The method according to claim 1, further comprising the step of storing the results of said steps (1)–(3).

19. The method according to claim 11, further comprising the step of performing an arbitrary affine transformation on the texture coordinates.

20. The method according to claim 3, further comprising the step of further modulating the interpolated texture memory values of step (6) with a arbitrary attenuation value.

21. A system for backprojecting and volume rendering of projection data and volume data respectively, comprising:
   texture mapping means for texture mapping at least one of the projection data and volume data onto a polygon;
   rendering means for rendering the polygon to generate an intermediate result; and
   accumulating means for accumulating the intermediate result with prior intermediate results to thereby generate a final reconstruction.

22. The system of claim 21, wherein said texture mapping means comprises:
- means for loading all or part of at least one of the projection data and the volume data into texture memory;
- means for setting up texture memory address mapping; and
- means for setting up texture interpolation parameters.

23. The system of claim 21, wherein said rendering means comprises:
- means for specifying geometric and texture coordinates for each vertex of the polygon;
- means for transforming the texture coordinates based on at least one of a backprojection viewing geometry and a volume viewing geometry;
- means for subdividing the transformed texture coordinates of the polygon into triangles;
- means for rasterizing the triangles into screen aligned pixels;
- means for mapping the screen aligned pixels to texture memory addresses;
- means for interpolating texture memory values based on the texture memory addresses;
- modulating means for modulating the interpolated texture memory values with a color of the polygon to produce a result; and
- means for storing results obtained by said modulating means into a frame buffer memory.

24. The system of claim 21, wherein said accumulating means comprises: transferring means for transferring values from at least one of
   (a) one part of the frame buffer to another part of the frame buffer, and
   (b) to and from some further section of the system; and
- means for at least one of weighting, scaling, and biasing those values at least one of during, before and after operation of said transferring means.

* * * * *

UNITED STATES PATENT AND TRADEMARK OFFICE
CERTIFICATE OF CORRECTION

PATENT NO. : 6,002,738
DATED : December 14, 1999
INVENTOR(S) : Cabral et al.

It is certified that error appears in the above-identified patent and that said Letters Patent is hereby corrected as shown below:

Title page,
Item [45], replace "Dec. 14, 2000" with -- *Dec. 14, 2000 --.
Between Item [73] and Item [21], insert:
-- [*] Notice: This patent issued on a continued prosecution application filed under 37 CFR 1.53(d), and is subject to the twenty year patent term provisions of 35 U.S.C. 154(a)(2). --

After claim 24, please add the following claims:
-- 25. A method for backprojecting projection data, comprising the steps of:
  texture mapping projection data onto at least one polygon having vertices, whereby said texture mapping step creates interpolation parameters and sets up texture memory addresses;
  rendering the polygon to generate an intermediate result, whereby the intermediate result is accumulated with prior intermediate results to generate a total accumulation; and
  normalizing the total accumulation to thereby generate a final reconstruction.

26. The method according to claim 25, wherein said step of texture mapping comprises the steps of:
  determining, by a host, a beam geometry;
  establishing, by the host, a texture transformation matrix based on the beam geometry;
  scaling, by a geometry engine, a geometry transformation matrix;
  multiplying, by the geometry engine, the geometry transformation matrix by a translation factor, wherein the translation factor is determined by the geometry engine;
  initializing, by the host, an iteration counter to a starting value;
  determining, by the host, a new value for all or part of the projection data, the new value being partially dependent on the iteration counter value;
  loading, by the geometry engine, all or part of the projection data into texture memory; and
  multiplying, by the geometry engine, the geometry transformation matrix by a rotating factor.

27. The method according to claim 26, wherein said step of rendering the polygon comprises the steps of:
  assigning, by the host, to each vertex of the polygon a spatial coordinate and a texture coordinate;
  transforming, by the geometry engine, the texture coordinates based on a backprojection viewing geometry;

UNITED STATES PATENT AND TRADEMARK OFFICE
CERTIFICATE OF CORRECTION

PATENT NO.    : 6,002,738
DATED         : December 14, 1999
INVENTOR(S)   : Cabral et al.

It is certified that error appears in the above-identified patent and that said Letters Patent is hereby corrected as shown below:

multiplying, by the geometry engine, each spatial coordinate by the geometry transformation matrix;
    multiplying, by the geometry engine, each texture coordinate by the texture transformation matrix;
    subdividing, by the geometry engine, the polygon into a set of triangles;
    rasterizing, by a rasterizing unit, each of the triangles into screen aligned pixels;
    mapping, by a texture engine, the screen aligned pixels to the texture memory addresses;
    interpolating, by the texture engine, texture memory values based on the texture memory addresses;
    attenuating, by an attenuation unit, the interpolated texture memory values with a color of the polygon to produce an intermediate result, wherein said attenuating step is based on the beam geometry;
    storing the intermediate result into a frame buffer memory;
    moving the intermediate result in the frame buffer memory to an accumulation buffer memory;
    incrementing the iteration counter; and
    generating a total accumulation by accumulating the intermediate result in the accumulation buffer memory with prior intermediate results until the iteration counter is greater than or equal to the number of projections.

28.     The method according to claim 27, wherein said step of normalizing comprises the steps of:
    transferring the total accumulation from the accumulation buffer memory to the frame buffer memory; and
    at least one of weighting, scaling, and biasing the total accumulation at least one of during, before and after said transferring step to normalize the total accumulation to thereby generate the final reconstruction.

29.     The method according to claim 26, wherein the beam geometry is one of parallel beam, fan beam, cone beam, spiral fan beam and spiral cone beam.

30.     A method, for use in a computer system, for volume rendering volume data, comprising the steps of:
    texture mapping volume data onto at least one polygon having vertices, whereby said texture mapping step creates interpolation parameters and sets up texture memory addresses;
    rendering the polygon to generate an intermediate result, whereby the intermediate result is accumulated with prior intermediate results to generate a total accumulation; and
    normalizing the total accumulation to thereby generate a final reconstruction.

UNITED STATES PATENT AND TRADEMARK OFFICE
CERTIFICATE OF CORRECTION

PATENT NO. : 6,002,738
DATED : December 14, 1999
INVENTOR(S) : Cabral et al.

It is certified that error appears in the above-identified patent and that said Letters Patent is hereby corrected as shown below:

31. The method according to claim 30, wherein said step of texture mapping comprises the steps of:
    determining, by a host, a beam geometry;
    establishing, by the host, a texture transformation matrix based on the beam geometry;
    scaling, by a geometry engine, a geometry transformation matrix;
    multiplying, by the geometry engine, the geometry transformation matrix by a translation factor, wherein the translation factor is determined by the geometry engine;
    determining, by the host, a Z-plane sampling range, wherein the Z-plane sampling range corresponds to the farthest point on the polygon with respect to the eye of an observer viewing the intermediate result;
    using the Z-plane sampling range to construct, by the host, the polygon such that it is perpendicular to the observer's line of sight;
    loading, by the geometry engine, all or part of the volume data into texture memory; and
    multiplying, by the geometry engine, the geometry transformation matrix by a rotating factor.

32. The method according to claim 31, wherein said step of rendering the polygon comprises the steps of:
    assigning, by the host, to each vertex of the polygon a spatial coordinate and a texture coordinate;
    transforming, by the geometry engine, the texture coordinates based on a volume rendering geometry;
    multiplying, by the geometry engine, each spatial coordinate by the geometry transformation matrix;
    multiplying, by the geometry engine, each texture coordinate by the texture transformation matrix;
    subdividing, by the geometry engine, the polygon into a set of triangles;
    rasterizing, by a rasterizing unit, each of the triangles into screen aligned pixels;
    mapping, by a texture engine, the screen aligned pixels to the texture memory addresses;
    interpolating, by the texture engine, texture memory values based on the texture memory addresses;
    attenuating, by an attenuation unit, the interpolated texture memory values with a color of the polygon to produce an intermediate result, wherein said attenuating step is based on the beam geometry;
    storing the intermediate result into a frame buffer memory;
    moving the intermediate result in the frame buffer memory to an accumulation buffer memory;

UNITED STATES PATENT AND TRADEMARK OFFICE
CERTIFICATE OF CORRECTION

PATENT NO. : 6,002,738
DATED : December 14, 1999
INVENTOR(S) : Cabral et al.

It is certified that error appears in the above-identified patent and that said Letters Patent is hereby corrected as shown below:

incrementing the Z-plane sampling range by either a fixed or variable amount; and generating a total accumulation by accumulating the intermediate result in the accumulation buffer memory with prior intermediate results until the Z-plane sampling range reaches a point on the polygon that is closest to the observer.

33. The method according to claim 32, wherein said step of normalizing comprises the steps of:

transferring the total accumulation from the accumulation buffer memory to the frame buffer memory; and at least one of weighting, scaling, and biasing the total accumulation at least one of during, before and after said transferring step to normalize the total accumulation to thereby generate the final reconstruction.

34. The method according to claim 31, wherein the beam geometry is one of parallel beam, fan beam, cone beam, spiral fan beam and spiral cone beam.

35. A system for backprojecting projection data to create a final reconstruction, the system including a texture memory and a frame buffer memory, and the texture memory having addresses and the texture memory storing all or part of the projection data onto at least one polygon having vertices, comprising:

a host that determines a beam geometry and then establishes a texture transformation matrix based on the beam geometry;

a geometry engine that scales a geometry transformation matrix, wherein said geometry engine then multiplies the geometry transformation matrix by a translation factor, wherein said host determines a new value for all or part of the projection data, wherein the geometry engine loads all or part of the projection data into texture memory, wherein said geometry engine multiplies the geometry transformation matrix by a rotating factor, wherein said host assigns to each vertex of the polygon a spatial coordinate and a texture coordinate, wherein said geometry engine transforms the texture coordinates based on a backprojection viewing geometry, wherein said geometry engine multiplies each spatial coordinate by the geometry transformation matrix; wherein said geometry engine multiplies each texture coordinate by the texture transformation matrix, and wherein said geometry engine divides the polygon into a set of triangles;

a rasterizing unit that rasterizes each of the triangles into screen aligned pixels;

a texture engine that maps the screen aligned pixels to the texture memory addresses, wherein said texture engine interpolates texture memory values based on the texture memory addresses; and an attenuation unit that attenuates the interpolated texture memory values with a color of the polygon to produce an intermediate result, wherein the intermediate result gets stored into the frame buffer memory and then into an accumulation buffer memory, wherein said intermediate

UNITED STATES PATENT AND TRADEMARK OFFICE
CERTIFICATE OF CORRECTION

PATENT NO. : 6,002,738
DATED : December 14, 1999
INVENTOR(S) : Cabral et al.

It is certified that error appears in the above-identified patent and that said Letters Patent is hereby corrected as shown below:

result gets accumulated with other intermediate results to thereby generate a total accumulation, and wherein said total accumulation is normalized to thereby generate the final reconstruction.

36. The system according to claim 35, wherein the beam geometry is one of parallel beam, fan beam, cone beam, spiral fan beam and spiral cone beam.

37. The system according to claim 35, wherein said geometry engine performs an arbitrary affine transformation on the texture coordinates.

38. The system according to claim 35, further comprising a general purpose graphics and imaging computer that performs the functions of said host, said geometry engine, said rasterizing unit, said texture engine and said attenuation unit.

39. The system according to claim 35, further comprising a monitor coupled to the frame buffer memory for displaying the results of said host, said geometry engine, said rasterizing unit, said texture engine and said attenuation unit.

40. A system for volume rendering volume data to create a final reconstruction, the system including a texture memory and a frame buffer memory, and the texture memory having addresses and the texture memory storing all or part of the volume data onto at least one polygon having vertices, comprising:

a host that determines a beam geometry and then establishes a texture transformation matrix based on the beam geometry;

a geometry engine that scales a geometry transformation matrix, wherein said geometry engine then multiplies the geometry transformation matrix by a translation factor, wherein said host determines a new value for all or part of the volume data, wherein the geometry engine loads all or part of the volume data into texture memory, wherein said geometry engine multiplies the geometry transformation matrix by a rotating factor, wherein said host assigns to each vertex of the polygon a spatial coordinate and a texture coordinate, wherein said geometry engine transforms the texture coordinates based on a volume rendering geometry, wherein said geometry engine multiplies each spatial coordinate by the geometry transformation matrix, wherein said geometry engine multiplies each texture coordinate by the texture transformation matrix, and wherein said geometry engine divides the polygon into a set of triangles;

a rasterizing unit that rasterizes each of the triangles into screen aligned pixels;

a texture engine that maps the screen aligned pixels to the texture memory addresses, wherein said texture engine interpolates texture memory values based on the texture memory addresses; and

UNITED STATES PATENT AND TRADEMARK OFFICE
CERTIFICATE OF CORRECTION

PATENT NO. : 6,002,738
DATED : December 14, 1999
INVENTOR(S) : Cabral et al.

It is certified that error appears in the above-identified patent and that said Letters Patent is hereby corrected as shown below:

an attenuation unit that attenuates the interpolated texture memory values with a color of the polygon to produce an intermediate result, wherein the intermediate result gets stored into the frame buffer memory and then into an accumulation buffer memory, wherein said intermediate result gets accumulated with other intermediate results to thereby generate a total accumulation, and wherein said total accumulation is normalized to thereby generate the final reconstruction.

41. The system according to claim 40, wherein the beam geometry is one of parallel beam, fan beam, cone beam, spiral fan beam and spiral cone beam.

42. The system according to claim 40, wherein said geometry engine performs an arbitrary affine transformation on the texture coordinates.

43. The system according to claim 40, wherein the volume data includes at least one of (i) data reconstructed from sinograms, (ii) data obtained using physical sensors, and (iii) artificially created data.

44. The system according to claim 40, further comprising a general purpose graphics and imaging computer that performs the functions of said host, said geometry engine, said rasterizing unit, said texture engine and said attenuation unit.

45. The system according to claim 40, further comprising a monitor coupled to the frame buffer memory for displaying the results of said host; said geometry engine, said rasterizing unit, said texture engine and said attenuation unit.

46. A computer program product comprising a computer useable medium having computer readable program code means embodied in the medium for causing a program to execute on a computer that backprojects projection data, the computer readable program code means comprising:
a first computer readable program code means for texture mapping projection data onto at least one polygon having vertices, whereby said texture mapping step creates interpolation parameters and sets up texture memory addresses;
a second computer readable program code means for rendering the polygon to generate an intermediate result, whereby the intermediate result is accumulated with prior intermediate results to generate a total accumulation; and
a third computer readable program code means for normalizing the total accumulation to thereby generate a final reconstruction.

47. The computer program product according to claim 46, wherein said first computer readable program code means comprises:
means for determining a beam geometry;

UNITED STATES PATENT AND TRADEMARK OFFICE
CERTIFICATE OF CORRECTION

PATENT NO. : 6,002,738
DATED : December 14, 1999
INVENTOR(S) : Cabral et al.

It is certified that error appears in the above-identified patent and that said Letters Patent is hereby corrected as shown below:

means for establishing a texture transformation matrix based on the beam geometry;
    means for scaling a geometry transformation matrix;
    means for multiplying the geometry transformation matrix by a translation factor;
    means for initializing an iteration counter to a starting value;
    means for determining a new value for all or part of the projection data, the new value being partially dependent on the iteration counter value;
    means for loading all or part of the projection data into texture memory; and
    means for multiplying the geometry transformation matrix by a rotating factor.

48. The computer program product according to claim 47, wherein said second computer readable program code means comprises:
    means for assigning to each vertex of the polygon a spatial coordinate and a texture coordinate;
    means for transforming the texture coordinates based on a backprojection viewing geometry;
    means for multiplying each spatial coordinate by the geometry transformation matrix;
    means for multiplying each texture coordinate by the texture transformation matrix;
    means for subdividing the polygon into a set of triangles;
    means for rasterizing each of the triangles into screen aligned pixels;
    means for mapping the screen aligned pixels to the texture memory addresses;
    means for interpolating texture memory values based on the texture memory addresses;
    means for attenuating the interpolated texture memory values with a color of the polygon to produce an intermediate result, wherein said attenuating step is based on the beam geometry;
    means for storing the intermediate result into a frame buffer memory;
    means for moving the intermediate result in the frame buffer memory to an accumulation buffer memory;
    means for incrementing the iteration counter; and
    means for generating a total accumulation by accumulating the intermediate result in the accumulation buffer memory with prior intermediate results until the iteration counter is greater than or equal to the number of projections.

49. The computer program product according to claim 48, wherein said third computer readable program code means comprises:
    means for transferring the total accumulation from the accumulation buffer memory to the frame buffer memory; and
    means for at least one of weighting, scaling, and biasing the total accumulation at least one of during, before and after the total accumulation is transferred to normalize the total accumulation to thereby generate the final reconstruction.

UNITED STATES PATENT AND TRADEMARK OFFICE
CERTIFICATE OF CORRECTION

PATENT NO. : 6,002,738
DATED : December 14, 1999
INVENTOR(S) : Cabral et al.

It is certified that error appears in the above-identified patent and that said Letters Patent is hereby corrected as shown below:

50. A computer program product comprising a computer useable medium having computer readable program code means embodied in the medium for causing a program to execute on a computer that volume renders volume data, the computer readable program code means comprising:

a first computer readable program code means for texture mapping volume data onto at least one polygon having vertices, whereby said texture mapping step creates interpolation parameters and sets up texture memory addresses;

a second computer readable program code means for rendering the polygon to generate an intermediate result, whereby the intermediate result is accumulated with prior intermediate results to generate a total accumulation; and a third computer readable program code means for normalizing the total accumulation to thereby generate a final reconstruction.

51. The computer program product according to claim 50, wherein said first computer readable program code means comprises:

means for determining a beam geometry;
means for establishing a texture transformation matrix based on the beam geometry;
means for scaling a geometry transformation matrix;
means for multiplying the geometry transformation matrix by atranslation factor;
means for determining a Z-plane sampling range, wherein the Z-plane sampling range corresponds to the farthest point on the polygon with respect to the eye of an observer viewing the intermediate result;
means for using the Z-plane sampling range to construct the polygon such that it is perpendicular to the observer's line of sight;
means for loading all or part of the volume data into texture memory; and
means for multiplying the geometry transformation matrix by a rotating factor.

52. The computer program product according to claim 51, wherein said second computer readable program code means comprises:

means for assigning to each vertex of the polygon a spatial coordinate and a texture coordinate;
means for transforming the texture coordinates based on a volume rendering geometry;
means for multiplying each spatial coordinate by the geometry transformation matrix;
means for multiplying each texture coordinate by the texture transformation matrix;
means for subdividing the polygon into a set of triangles;
means for rasterizing each of the triangles into screen aligned pixels;
means for mapping the screen aligned pixels to the texture memory addresses;
means for interpolating texture memory values based on the texture memory addresses;
means for attenuating the interpolated texture memory values with a color of the polygon to produce an intermediate result, wherein said attenuating step is based on the beam geometry;

UNITED STATES PATENT AND TRADEMARK OFFICE
CERTIFICATE OF CORRECTION

PATENT NO. : 6,002,738
DATED : December 14, 1999
INVENTOR(S) : Cabral et al.

It is certified that error appears in the above-identified patent and that said Letters Patent is hereby corrected as shown below:

means for storing the intermediate result into a frame buffer memory;
    means for moving the intermediate result in the frame buffer memory to an accumulation buffer memory;
    means for incrementing the Z-plane sampling range by either a fixed or variable amount; and
    means for generating a total accumulation by accumulating the intermediate result in the accumulation buffer memory with prior intermediate results until the Z-plane sampling range reaches a point on the polygon that is closest to the observer.

53.    The computer program product according to claim 52, wherein said third computer readable program code means comprises:
    means for transferring the total accumulation from the accumulation buffer memory to the frame buffer memory; and
    means for at least one of weighting, scaling, and biasing the total accumulation at least one of during, before and after the total accumulation is transferred to normalize the total accumulation to thereby generate the final reconstruction.

54.    A system for backprojecting projection data in a backprojecting stage and volume rendering volume data in a volume rendering stage to create a final reconstruction, the system including a texture memory and a frame buffer memory., and the texture memory having addresses
and the texture memory storing all or part of the projection data onto at least one polygon having vertices in the backprojecting stage and storing all or part of the volume data onto at least one polygon having vertices in the volume rendering stage, comprising:
    a host that determines a beam geometry and then establishes a texture transformation matrix based on the beam geometry in both of the stages;
    a geometry engine that scales a geometry transformation matrix in both of the stages, wherein said geometry engine then multiplies the geometry transformation matrix by a translation factor in both of the stages, wherein said host determines a new value for all or part of the projection data in the backprojecting stage and a new value for all or part of the volume data in the volume rendering stage, wherein the geometry engine loads all or part of the projection data into texture memory in the backprojecting stage and all or part of the volume data into texture memory in the volume rendering stage, wherein said geometry engine multiplies the geometry transformation matrix by a rotating factor in both of the stages, wherein said host assigns to each vertex of the polygon a spatial coordinate and a texture coordinate in both of the stages, wherein said geometry engine transforms the texture coordinates based on a backprojection viewing geometry in the backprojecting stage and based on a volume rendering geometry in the volume rendering stage, wherein said geometry engine multiplies each spatial coordinate by the geometry transformation matrix in both of the stages, wherein said geometry engine multiplies each texture

UNITED STATES PATENT AND TRADEMARK OFFICE
CERTIFICATE OF CORRECTION

PATENT NO. : 6,002,738
DATED : December 14, 1999
INVENTOR(S) : Cabral et al.

It is certified that error appears in the above-identified patent and that said Letters Patent is hereby corrected as shown below:

coordinate by the texture transformation matrix in both of the stages, and wherein said geometry engine divides the polygon into a set of triangles in both of the stages;

a rasterizing unit that rasterizes each of the triangles into screen aligned pixels in both of the stages;

a texture engine that maps the screen aligned pixels to the texture memory addresses in both of the stages, wherein said texture engine interpolates texture memory values based on the texture memory addresses; and an attenuation unit that attenuates the interpolated texture memory values with a color of the polygon to produce an intermediate result in both of the stages, wherein the intermediate result gets stored into the frame buffer memory and then into an accumulation buffer memory, wherein said intermediate result gets accumulated with other intermediate results to thereby generate a total accumulation, and wherein said total accumulation is normalized to thereby generate the final reconstruction. --.

Title page,
Item [56], please add the following references --
-Russ, J.C., The Image Processing Handbook, CRC Press, Inc., Copyright 1992, pp. 338-365.
-Kak, A.C. and Slaney, M., Principles of Computerized Tomographic Imaging, IEEE Press, Copyright 1988, pp. 1-4.
-Bracewell, R.N., Two-Dimensional Imaging, Prentice-Hall, Inc., Copyright 1995, pp. 505-539.
-Jain, A.K., Fundamentals of Digital Image Processing, Prentice-Hall, Inc., Copyright 1989, pp. v-xviii and 431-475.
-Kajiya, J.T., "Ray Tracing Volume Densities," *Computer Graphics*, Volume 18, Number 3,
July, 1984, pp. 165-175.
-Sabella, P., "A Rendering Algorithm for Visualizing 3D Scalar Fields," *Computer Graphics*, Volume 22, Number 4, August, 1988, pp. 51-58.
-Upson, C. and Keeler, M., "V-BUFFER: Visible Volume Rendering," *Computer Graphics*, Volume 22, Number 4, August, 1988, pp. 59-64.
-Drebin, R.A. *et al.*, "Volume Rendering," *Computer Graphics*, Volume 22, Number 4, August, 1988, pp. 65-74.
-Westover, L., "Footprint Evaluation for Volume Rendering," *Computer Graphics*, Volume 24, Number 4, August, 1990, pp. 367-376.
-Krueger, W., "The application of transport theory to visualization of 3-D scalar data fields," *Computers in* Physics, July/August, 1991, pp. 397-406.

UNITED STATES PATENT AND TRADEMARK OFFICE
CERTIFICATE OF CORRECTION

PATENT NO. : 6,002,738
DATED : December 14, 1999
INVENTOR(S) : Cabral et al.

It is certified that error appears in the above-identified patent and that said Letters Patent is hereby corrected as shown below:

-Totsuka, T. and Uvoy, M., "Frequency Domain Volume Rendering," *Computer Graphics Proceedings, Annual Conference Series*, 1993, pp. 271-278.
-Cabral, B. *et al.*, "Accelerated Volume Rendering and Tomographic Reconstruction Using Texture Mapping Hardware," *Proceedings of the 1994 Symposium on Volume Visualization*, 1995, pp. 91-98.
-Kajiya, J.T.; "The Rendering Equation," *Computer Graphics*, Volume 20, Number 4, August, 1986, pp. 143-150.
-Porter, T. and Duff, T., "Compositing Digital Images," *Computer Graphics*, Volume 18, Number 3, July, 1984, p. 253-259.
-Segal, M. *et al.*, "Fast Shadows and Lighting Effects Using Texture Mapping," *Computer Graphics*, Volume 26, Number 2, July, 1992, pp. 249-252.
-Azevedo, S.G. *et al.*, "Tomographics image reconstruction and rendering with texture-mapping hardware," SPIE, Volume 2299, pp. 280-291, (July 14, 1994).
-Foley, J.D. *et al.*, Second Edition in C: Computer Graphics Principles and Practice, Addison-Wesley Publishing Company, Copyright 1996, 1990, pp. xvii-xxiii and 855-922.
-Azevedo, Stephen G., "Model-based computed tomography for nondestructive evaluation," Ph.D. Thesis, Copyright 1991, pp. i-xi and 1-210. --

Column 6,
Lines 56 and, please replace the 3 occurrences of "$\tilde{\omega}$" with -- $\omega$ --.
Lines 58 and 62, please replace the 2 occurrences of "$d\,xd\,y$" with --$dxdy$--.

Column 7,
Line 11,13 and 36 please replace the 11 occurrences of "$\tilde{\omega}$" with -- $\omega$ --.

Column 8,
Line 3, please replace "$(x_i, y)$" with -- $(x_i, y_j)$ --.

Column 9,
Line 57, please replace "$(x_i, y)$" with -- $(x_i, y_j)$ --.

Column 10,
Please replace equation 21 (lines 20-23) with the following equation:

$$p(s',t',\beta) = \int_0^{\sqrt{s'^2+t'^2+f'^2}} f(x(l), y(l), z(l))\,dl$$

UNITED STATES PATENT AND TRADEMARK OFFICE
CERTIFICATE OF CORRECTION

PATENT NO.   : 6,002,738
DATED        : December 14, 1999
INVENTOR(S)  : Cabral et al.

It is certified that error appears in the above-identified patent and that said Letters Patent is hereby corrected as shown below:

Column 11,
Line 3, please replace with "$d\,\beta$" with -- $d\beta$ --.

Column 2,
Line 19, please replace "As a x-rays" with -- As an x-ray --.
Line 57, please replace "texturing" with -- texture --.

Column 6,
Line 9, please replace "y(f)" with -- y(1) --.
Line 13, please replace "x(f)" with -- x(1) --.

Column 7,
Please replace lines 44-45 with -- Here, $\tilde{p}$, merely represents a filtered version of the projection p. f, has a form identical to that found in equation (1), that --.

Column 16,
Line 63, please replace "vk" with -- $\sqrt{k}$ --.

Column 19,
Line 39 (claim 1), please insert -- data -- after "volume".

Column 20,
Line 34 (claim 12), please replace "amine" with -- affine --.

Signed and Sealed this

Eleventh Day of December, 2001

*Attest:*

*Attesting Officer*

NICHOLAS P. GODICI
*Acting Director of the United States Patent and Trademark Office*